(12) United States Patent
Patrick

(10) Patent No.: US 8,430,286 B1
(45) Date of Patent: Apr. 30, 2013

(54) BOAT CARRYING RACK FOR USE ON TRANSPORTING VEHICLES

(76) Inventor: Jefferson L. Patrick, Shinnston, WV (US)

( * ) Notice: Subject to any disclaimer, the term of this patent is extended or adjusted under 35 U.S.C. 154(b) by 2091 days.

(21) Appl. No.: 10/826,763

(22) Filed: Apr. 16, 2004

Related U.S. Application Data

(60) Provisional application No. 60/463,815, filed on Apr. 18, 2003.

(51) Int. Cl.
*B60R 9/00* (2006.01)

(52) U.S. Cl.
USPC ............ 224/401; 224/405; 224/494; 224/310

(58) Field of Classification Search .................. 224/401, 224/402, 403, 405, 310, 494; 414/462
See application file for complete search history.

(56) References Cited

U.S. PATENT DOCUMENTS

| | | | | |
|---|---|---|---|---|
| 2,508,757 | A * | 5/1950 | Gray | 224/494 |
| 2,785,816 | A * | 3/1957 | Fisher | 414/462 |
| 3,329,323 | A | 7/1967 | Tanaka | |
| 3,338,484 | A | 8/1967 | Hall | |
| 3,547,325 | A | 12/1970 | Hill et al. | |
| 3,737,083 | A | 6/1973 | Lund | |
| 3,819,074 | A * | 6/1974 | Oliver | 414/462 |
| 3,893,568 | A * | 7/1975 | Lile | 224/403 |
| 4,603,798 | A | 8/1986 | Griswold | |
| 4,630,990 | A * | 12/1986 | Whiting | 414/462 |
| D292,504 | S | 10/1987 | Racicot | |
| 5,354,164 | A * | 10/1994 | Goss et al. | 414/462 |
| 5,458,389 | A * | 10/1995 | Young | 296/26.08 |
| 5,544,798 | A * | 8/1996 | Shumate et al. | 224/402 |
| 5,560,666 | A * | 10/1996 | Vieira et al. | 296/3 |
| 5,609,462 | A * | 3/1997 | Reimer | 414/462 |
| 5,649,656 | A * | 7/1997 | Davy | 224/405 |
| 5,662,451 | A * | 9/1997 | Muzzi et al. | 414/462 |
| 6,105,721 | A | 8/2000 | Haynes | |
| 6,126,052 | A * | 10/2000 | Toivola | 224/401 |
| 6,312,210 | B1 | 11/2001 | Lang | |
| 6,517,134 | B2 * | 2/2003 | Armstrong | 224/405 |
| 6,955,384 | B1 * | 10/2005 | Good | 224/405 |

* cited by examiner

*Primary Examiner* — Justin Larson
*Assistant Examiner* — Lester L Vanterpool
(74) *Attorney, Agent, or Firm* — Mark Clodfelter

(57) ABSTRACT

An accessory rack for transporting objects such as small boats on an ATV or pickup truck includes a pair of upright posts, one mounted on a front rack support at a front platform and the other at a rear platform. Each of the posts is connected to a base member secured to a rack support, and cross members with upturned ends for receiving a boat are connected to tops of the posts. An elongated beam is connected to the cross members at both ends of the beam. Square steel tubing is used for most of the structure, with sizes being varied to allow overlap and adjusting length of components. Racks for use in pickup trucks may be bolted to the pickup bed.

13 Claims, 5 Drawing Sheets

US 8,430,286 B1

BOAT CARRYING RACK FOR USE ON TRANSPORTING VEHICLES

CROSS REFERENCE TO RELATED APPLICATION

This application claims the benefit of Provisional Application Ser. No. 60/463,815, filed Apr. 18, 2003.

FIELD OF THE INVENTION

This invention relates to carrier accessories for transporting small boats on vehicles, and more particularly to boat carrier racks for use on all terrain vehicles (ATV's) and pickup trucks.

BACKGROUND OF THE INVENTION

All terrain vehicles, as the name indicates, provide an attractive means for transporting various objects to remote locations which are inaccessible to other types of vehicles. ATV's normally are equipped with front and rear racks each extending generally the width of the ATV and suitable for carrying small objects which may be placed on a rack and secured as necessary. Elongated objects such as small boats or canoes useful for fishing or duck hunting at remote locations would require additional support that is not provided by standard equipment in the form of front and rear racks.

Various accessory racks have been developed for supporting objects such as rifles, tree stands and hoisting equipment on ATV's, these racks normally being connected to only the existing rear rack. A canoe carrier system connected to both the front and rear racks of an ATV is disclosed in U.S. Pat. No. 6,126,052, issued to Toivola on Oct. 3, 2000. This patent includes four vertical support members, one at each corner and a pair of elongated support members at the top. It would be desirable to provide a small boat carrier rack attachable to an ATV, but using fewer structural members where this can be done without loss of strength or function, thus reducing weight and the number of dead spots obstructing vision of a driver. Other desirable features would be to provide for adjustability of dimensions in all directions and to include additional protection against movement of a supported boat. Many of these criteria are also applicable to carrier racks mounted on pickup trucks.

SUMMARY OF THE INVENTION

The present invention is directed to an accessory rack for carrying objects such as small boats on an ATV or other vehicles providing a suitable platform for mounting the rack, in particular pickup trucks having a conventional bed. The accessory rack includes a front end assembly and a rear end assembly in facing relation, each of the assemblies having a bottom base member adapted to be connected across an existing rack on a an ATV, an upright post connected to the base member at a center point thereof and a horizontal boat-receiving cross member connected at a center point thereof to the top of the post, the front and rear assemblies being connected to one another by an elongated beam aligned coplanar and centered with the upright posts. The cross members preferably have a portion at each end bent upwards to form a U-shaped cradle effective to keep a transported object from sliding off a side of the rack. All structural components listed above are preferably made of square steel tubing, with certain portions having dimensions different from one another so as to enable size adjustments as explained below. To provide maximum strength of the assembled device, gussets may be incorporated at all joints between structural members. Tie-down straps, threaded through openings in a bracket connected to structural members at appropriate locations, are provided to hold a transported boat down.

Boat carrier racks embodying the invention provide important advantages in their light weight, resulting from use of a minimum of structural members without adversely affecting strength or performance of the device, and in their capability for being easily adjusted in size for different loads.

DESCRIPTION OF THE PREFERRED EMBODIMENT

Figure 1:
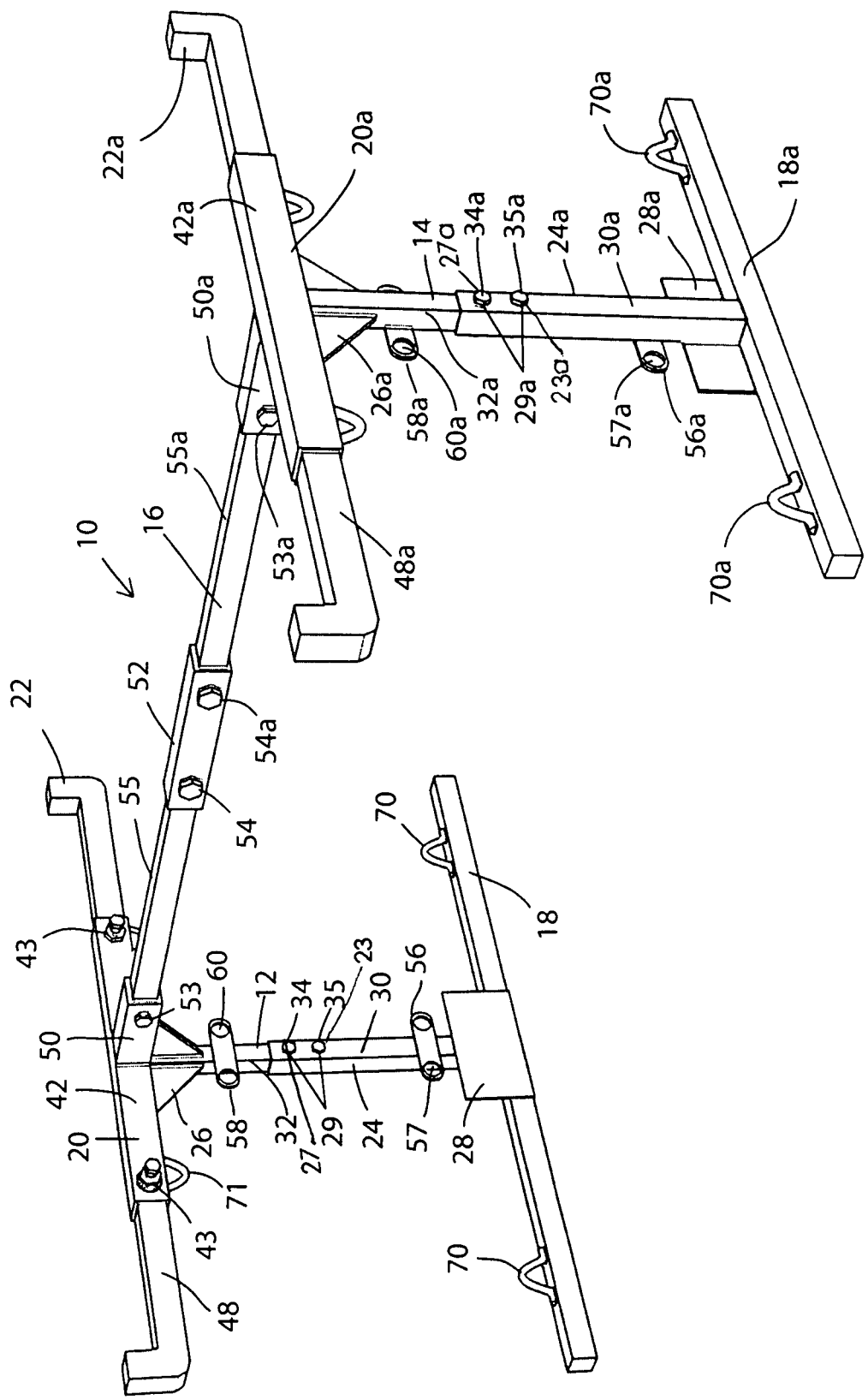
FIG. 1 is a perspective view, taken from above, of a boat carrier rack for use on an ATV or a pickup truck.
Figure 2:
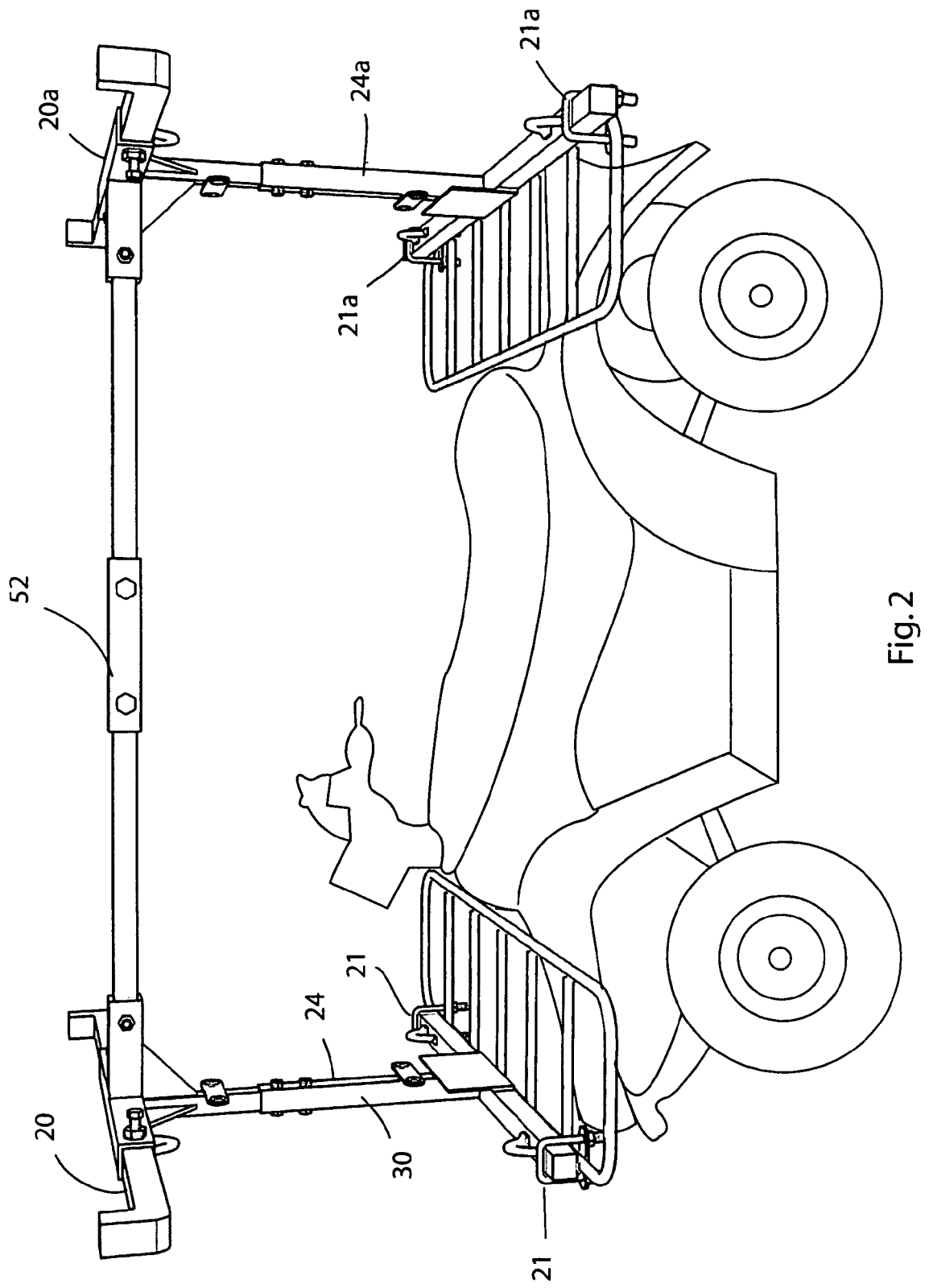
FIG. 2 is a perspective view of a carrier rack installed on an ATV base.
Figure 3:
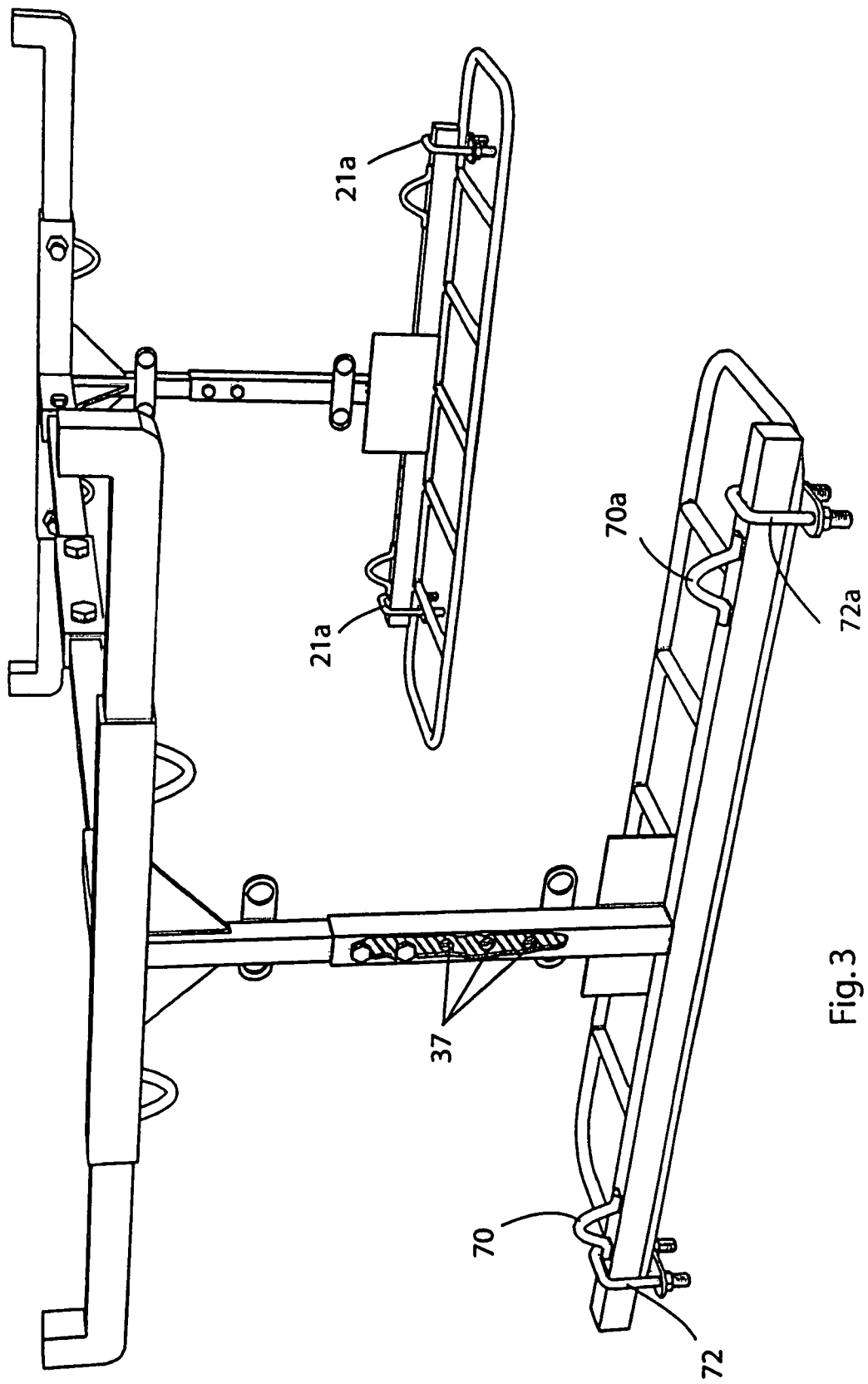
FIG. 3 is a perspective view, partly broken away, showing more details of the carrier rack.

Referring to FIG. 1 of the drawings, there is shown a boat carrier rack 10 comprising a rear support assembly 12, a front support assembly 14 and an elongated beam 16 connecting the two assemblies. Each of the assemblies has a front bottom base member 18, a rear bottom base member 18a extending across the width of a respective existing rack on the ATV, an upper cross member 20, 20a bent upward at ends 22, 22a to form a cradle in which a boat or other object is received, each bottom base member and the upper cross member being connected by a vertical post 24, 24a. With this construction, posts 24, 24a are above a center of respective front and rear portions of the ATV (FIGS. 2, 3). Joints between the vertical posts, cross members and the elongated beam are preferably reinforced by providing triangular gussets 26, 26a or rectangular plates 28, 28a at each joint.

In order to enable use of a minimum number of structural elements, consistent with necessary strength, the basic structural components of the rack are preferably comprised of square metal tubing made of steel or other high-strength metal. In addition, by selection of tubing having different sizes at adjacent locations, end portions of tubing parts may be slid into one another, enabling adjustment of length dimensions of the respective parts.

Although the invention is not to be understood as limited to specific dimensions, the base members 18, 18a of the end assemblies may comprise a single piece of 1 and ½ inch square metal tubing having a length of 43 inches for the rear assembly 12 and 33 inches for the front assembly 14, these different lengths accommodating differences in front and rear racks as installed on ATV's. Base members are connected to cross members of installed racks by means such as U-bolts 21 (FIG. 3) provided at each corner. As shown in FIG. 3, base members 18, 18a are configured to be mounted to the ATV racks so that vertical posts 24, 24a are centered with respect to a width of the vehicle.

Vertical posts 24, 24a are preferably made up of two parts, a lower portion 30, 30a connected to a base member at the center of the length thereof and extending upward for a length of about one half of the post and an upper portion 32, 32a sized to fit within the lower portion for sliding movement therein for making vertical adjustments. The upper portion may have a length sufficient to allow the top of the vertical posts to be located a distance such as three feet above the base members. In order to hold the upper portion at a selected height, the lower portion may have a pair of holes 34, 34*a* and 35, 35*a* extending across and receiving bolts 27, 27*a* and 23, 23*a* engaged by lock nuts 29. The upper portions 32,32*a* of the vertical posts are preferably provided with a series of holes 37 (FIG. 3) at spaced-apart locations allowing selection of a pair the holes enabling insertion of bolts at an elevation providing a desired height for the end assemblies. Vertical adjustments using this feature may be used to fit the available space to the height of the driver of the ATV.

Figure 4:
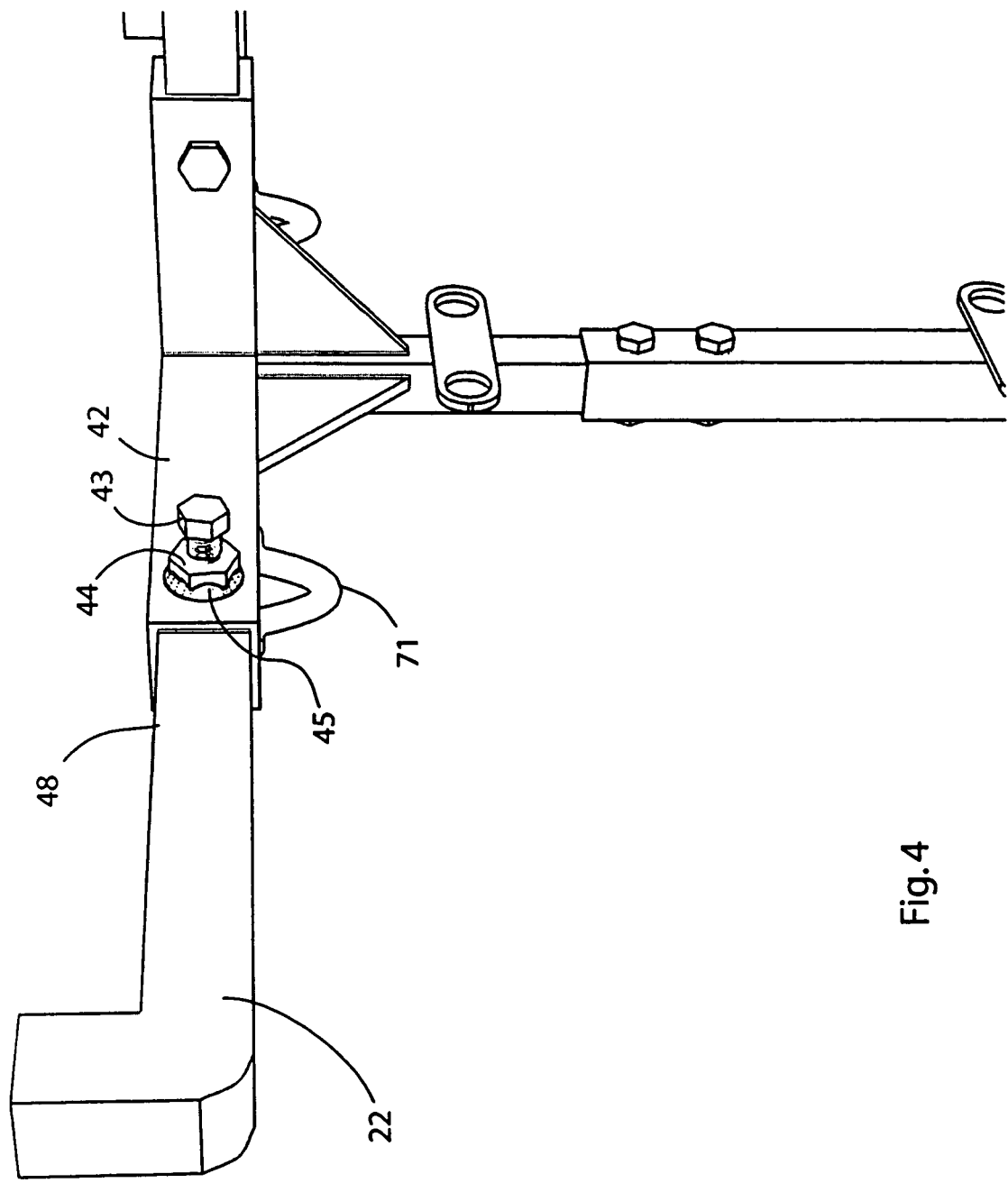
FIG. 4 is an enlarged fragmentary view showing details of a connection of an upwardly extending arm to the rack.

Upper portions 32, 32*a* of the vertical posts have their top ends connected to a center point of middle portions 42, 42*a* of the cross members, the middle portion being of a length such as two feet. End portions 22, 22*a* are L-shaped members having one arm 48,48*a* inserted in an outer end of middle portion 42, 42*a* and the other arms 22, 22*a* extending upwards, providing a barrier to keep a supported object from sliding off. Connection of end portions 22, 22*a* to middle portions 42, 42*a* are preferably made by insertion of bolts 43 through an opening in a side of this portion and engaging a jam nut 44 and a weld nut 45 underneath the jam nut as shown in FIG. 4. Varying the length of the cross member may be carried out by loosening the bolts and sliding end portions inward or outward in the middle portion. Unlike the vertical post connections described above, this connection does not require insertion of a bolt all the way through the middle portion.

Beam 16 is preferably made up of three parts: stubs 50, 50*a* connected at the center point of the middle portions of the cross members by means such as a bolt 53, 53*a*, beam portions 55, 55*a* and a middle sleeve member 52 which receives middle ends of portions 55, 55*a*. The sleeve is connected to the beam portions by bolts 54, 54*a* extending through the beam. Unlike the joints for vertical posts, this connection is preferably left to be made by custom fitting through a single hole in each of the inner ends for being connected to the sleeve. This approach avoids the presence of a series of bolt holes, which could result in weakening the beam. With this construction, beam 16 extends between center points of boat-receiving cross members 22, 22*a* longitudinally over a central region of the ATV, as shown in FIG. 2.

Each of the lower portions of the posts has a bracket 56, 56*a* connected to the lower end of the post, the bracket provided with openings 57, 57*a* for receiving a strap (not shown) wrapped around a boat or other object and securing it in position. A second bracket 58, 58*a* may be provided on the upper portion of the vertical posts, these brackets having openings 60, 60*a* for receiving additional straps if necessary. The straps may include a ratcheting device for tightening and one or more S hooks for engaging the openings in the brackets.

Metal loops 70, 70*a* may be connected to the base members for receiving other tie-down ropes or the like as may be needed to secure other transported objects in place. Similar loops 71 are provided on cross members 20, 20*a*.

As shown in FIG. 3, U-bolts 72, 72*a* and 21, 21*a* are preferably used to connect the base members to front and rear racks of an ATV. The U-bolts may be provided with sufficient slack to allow connection with underlying rack members that extend in either a direction generally parallel to the base members or in a direction perpendicular to the base members. The U-bolts are preferably located near to the ends of the base members, and the metal loops may be placed inside of the U-bolts.

Figure 5:
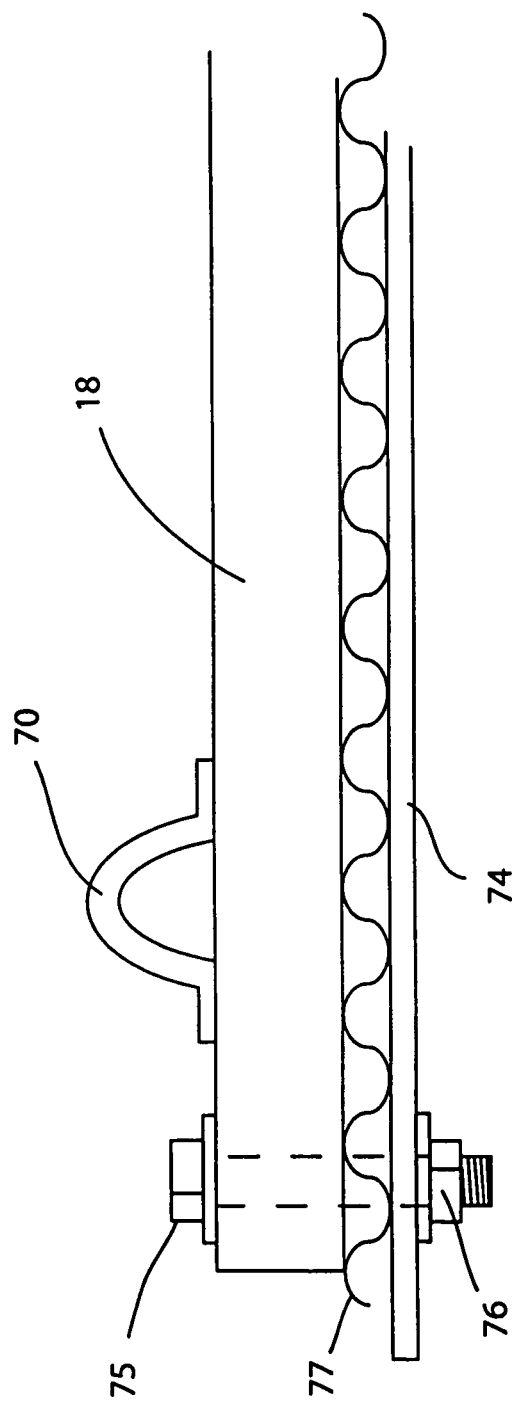
FIG. 5 is a view showing attachment of a boat-transporting rack to a pickup truck bed.

Boat-supporting accessory racks embodying the invention may also be installed on the bed of a pickup truck, with adjustments being made to fit onto the truck bed. The length of the beam would depend on the length of the bed. Connection of the base members to the truck may be carried out use of four bolts, one at each corner. As shown in FIG. 5, base members 18, 18*a* are bolted to the truck bed 74 by bolt 76, which also passes through bed liner 77.

Although the invention is illustrated for use in transporting boats, it is to be understood that other watercraft such as canoes and kayaks are included within this terminology. Other objects such as lumber, posts and other building material and similar products may also be transported by use of the invention, wherein

I claim:

1. An accessory rack for supporting small boats on a transporting vehicle having available a front platform site extending generally across a width of a front of said vehicle and a rear platform site extending generally across a width of a rear of said vehicle, said accessory rack comprising:

a front assembly having the elongated front bottom base member attachable across a width of said front platform site and a rear assembly having an elongated rear bottom base member attachable across a width of said rear platform site, a single front upright post connected at a lower end to the center of said front bottom base member of said front assembly so that said front upright post is generally centered with respect to said width of said vehicle, an elongated front boat-receiving cross member connected at the center thereof to an upper end of said single front upright post, said elongated front boat-receiving cross member being generally parallel to said elongated front bottom base member;

a single rear upright post connected at a lower end to the center of said rear bottom base member of said rear assembly so that said rear upright post is generally centered with respect to said width of said vehicle, an elongated rear boat-receiving cross member connected at the center thereof to an upper end of said single rear upright post, said elongated rear boat-receiving cross member being generally parallel to said elongated rear bottom base member;

a single elongated upper beam member extending between said front boat-receiving cross member and said rear boat-receiving cross member, said elongated upper beam member connected to said center of said front boat-receiving cross member and said center of said rear boat-receiving cross member so that said front upright post, said rear upright post and said upper beam member are generally centered over respective portions of said vehicle;

wherein each of said front upright post and said rear upright post further comprises:

a lower upright post portion attached to said center of a respective one of said elongated front bottom base member and said elongated rear bottom base member, an upper upright post portion attached to said center of a respective one of said front boat-receiving cross member and said rear boat-receiving cross member, each said lower upright post portion and said upper upright post portion configured to be removably and adjustably engagable with each other so that said boat-receiving cross member is locked at a selected height over said vehicle and generally centered over said vehicle with respect to said vehicle width;

wherein each said upper post portion and said boat-receiving cross member further comprises:

an elongated middle portion generally parallel to said bottom base member and connected at the center thereof to said upper end of said upper post portion, said elongated middle portion having opposed ends, a boat-receiving end portion for each of said opposed ends, each said boat-receiving end portion configured to be removably and adjustably engaged, and lockable with a respective end of said middle portion to provide said cross member with a selected width, a stub portion attached to said center of said middle portion, and facing an opposite one of said front assembly and said rear assembly for removably and slidably receiving and locking to said upper beam members, said stub portion being coplanar with and perpendicular to said middle portion, and said upper beam member and each said stub portion being adaptable so that a user may select a length of said rack for a specific said vehicle;

a plurality of gear attachments attached to said rack, each said gear attachment having an opening for receiving a tie-down, and attached adjacent at least one of:

a center of each said elongated middle portion, at least one end of said front mounting base member and at least one end of said rear mounting base member, at an upper end of each said lower upright post portion.

2. The accessory rack as defined in claim 1 wherein said front boat-receiving cross member and said rear boat-receiving cross member each has an upturned arm at each end.

3. The accessory rack as defined in claim 1 wherein each of said lower post portion and said upper post portion are constructed of rectangular or square metal tubing, and each provided with a series of alignable, vertically spaced-apart holes to allow a locking member to be inserted through said lower post portion and said upper post portion, locking said boat-receiving cross member at said selected height.

4. The accessory rack as defined in claim 1 wherein said transporting vehicle is an ATV.

5. The accessory rack as defined in claim 1 wherein said front bottom base member and said rear bottom base member extends across a width of each said platform site, and are attachable thereto with U-bolts.

6. The accessory rack as defined in claim 1 wherein each said middle portion is about 2 feet in length, and extends about one foot to either side of a top of a respective said upper post portion.

7. The accessory rack as defined in claim 1 wherein said lower upright post portion is about one half a height of said front upright post and said rear upright post.

8. The accessory rack as defined in claim 1 wherein each said upper post portion may be adjusted and locked within said lower post portion at a height so that a top of said upper post portion and said elongated middle portion is about 3 feet over said vehicle.

9. The accessory rack as defined in claim 1 wherein said front bottom base member is about 33 inches in length and said rear bottom base member is about 43 inches in length.

10. The accessory rack as defined in claim 1 wherein said upper post portion may be adjusted and locked within said lower post portion so that a top of said upper post portion is about 3 feet above a said front bottom base member and a said rear bottom base member.

11. A method for carrying a boat above a vehicle comprising:

mounting a first single vertical support so that said first single vertical support extends upward over a middle of a front of said vehicle, said middle being with respect to width of said vehicle, mounting a second single vertical support so that said second single vertical support extends upward over said middle of a rear of said vehicle, providing a first boat-receiving member to an end of said first single vertical support, said first boat-receiving member being horizontally disposed along said width of said vehicle and attached at its center to said top of said first vertical support, providing a second boat-receiving member to an end of said second vertical support, said second boat-receiving member being horizontally disposed along said width of said vehicle, using a connecting member, connecting said first boat-receiving member and said second boat-receiving member together, said connecting member extending over said middle of said vehicle.

12. A method as set forth in claim 11 further comprising adjusting a height of said first boat-receiving member over said vehicle and said second boat-receiving member over said vehicle to accommodate height of an operator of said vehicle.

13. A method as set forth in claim 11 further comprising adjusting a width of said first boat-receiving member and said second boat-receiving member to accommodate boats of differing widths.

* * * * *